Z. HAWKINS.
NUT LOCK.
APPLICATION FILED JULY 12, 1916.
1,214,783.
Patented Feb. 6, 1917.
2 SHEETS—SHEET 1.
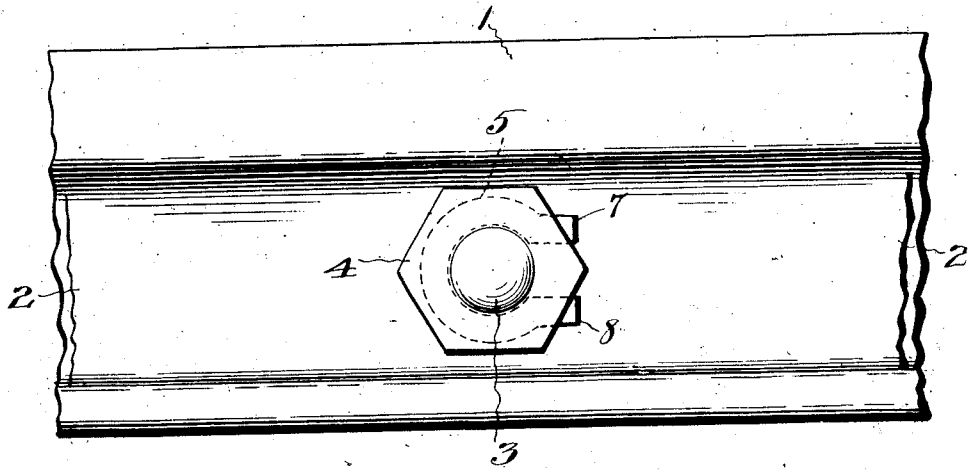
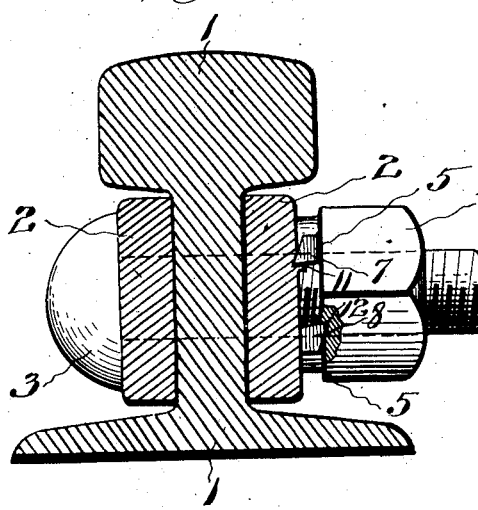
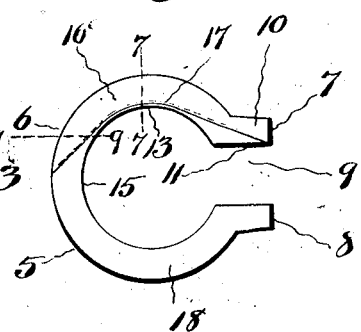
Inventor
By
Attorney

Z. HAWKINS.
NUT LOCK.
APPLICATION FILED JULY 12, 1916.

1,214,783.

Patented Feb. 6, 1917.
2 SHEETS—SHEET 2.

Inventor

UNITED STATES PATENT OFFICE.

ZACHARIAH HAWKINS, OF CANTON, OHIO, ASSIGNOR OF ONE-HALF TO GEORGE W. HAWKINS, OF CANTON, OHIO.

NUT-LOCK.

1,214,783.   Specification of Letters Patent.   Patented Feb. 6, 1917.

Application filed July 12, 1916. Serial No. 108,843.

*To all whom it may concern:*

Be it known that I, ZACHARIAH HAWKINS, a citizen of the United States, residing at Canton, in the county of Stark, State of Ohio, have invented certain new and useful Improvements in Nut-Locks; and I do declare the following to be a full, clear, and exact description of the invention, such as will enable others skilled in the art to which it pertains to make and use the same.

My invention relates to improvements in nut locks and more particularly to lock-washers for the same.

It has for its object to provide a lock-washer for nut locks which has a maximum degree of tensile strength and locking power.

It further has for its object to provide a lock-washer for nut locks with locking means on both faces thereof.

It still further has for its object to provide a lock-washer for nut locks which will cut or impress itself into both surfaces between which it is or may be placed in such a manner that the more pressure the nut exerts, in its efforts to back or turn off the bolt, the tighter it will be held and locked by the lock-washer.

It further has for its object to provide a lock washer for nut locks which is simple, inexpensive and durable in construction, not liable to get out of order, easy to apply and very effective in use.

It still further has for its object to provide a lock washer for nut locks which will not be affected by the vibrations or movement of the part or parts on which it is used and allow the loosening of the nut, but will hold and lock the nut positively and securely at all times.

The invention consists in the several features and in the construction, combination and arrangement of features as more fully hereinafter described and claimed.

Figure 4:
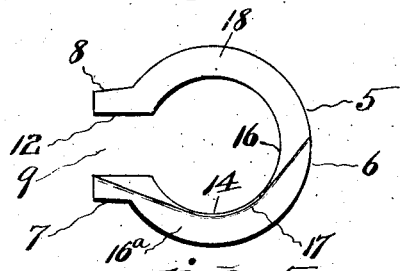
Figure 5:
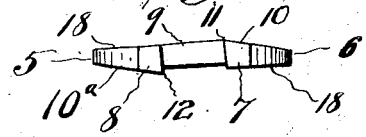
Figure 6:
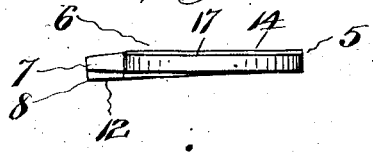
Figure 7:
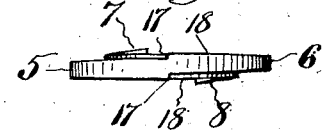
Figure 8:
Figure 9:
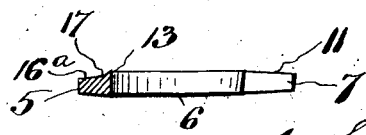

Referring to the drawings:—Figure 1 is a side elevation of a portion of a railroad rail with my invention applied thereto. Fig. 2 is a vertical section. Fig. 3 is a plan view of one face of the lock-washer. Fig. 4 is a plan view of the opposite face of the lock-washer. Fig. 5 is a front edge view of the lock-washer looking at the free ends thereof. Fig. 6 is a side edge view. Fig. 7 is a rear edge view. Fig. 8 is an enlarged cross section on the line 7—7 of Fig. 3, and Fig. 9 is a cross section on the line 9—9 of Fig. 3.

In the drawings in which similar reference characters denote similar parts throughout the several views, 1 represents a railroad rail, 2 fish plates, 3 a screwthreaded bolt, and 4 a nut, all being of well known form and construction.

My improved nut lock comprises a lock-washer 5 which is formed of a bar of rigid steel or other suitable unyielding material and made in the shape, preferably, of a ring 6 and spirally twisted and provided with lugs 7 and 8 projecting laterally beyond the outer circumference of the ring 6 and having an open space 9 therebetween.

The laterally projecting lug 7 has an inwardly and upwardly inclined upper surface 10 terminating in a straight knife edge 11 and the laterally projecting lug 8 has an inwardly and upwardly inclined surface $10^a$ terminating in a straight knife edge 12, the knife edge 11 being on the upper edge of the lug 7 and the knife edge 12 being on the lower edge of the lug 8, the knife edges thereby being disposed diagonally opposite each other in different horizontal planes.

Curved knife edges 13 and 14 are provided on the inner edges 15 and 16, respectively, of the faces of the ring 6 and form a continuation of the straight knife edges of the two lugs, and in order to allow sufficient clearance for the knife edges to sink into or bite into the surfaces of the fish plate nut or other article, with which the lock washer is designed to be locked, the ring is cut away and beveled downwardly as at $16^a$ to the outer edge of the ring and forms a beveled shoulder 17 just behind each of the curved knife edges 13 and 14. Each surface of the ring 6 is also beveled downwardly as at 18 from the inner to the outer edges thereof.

By having the knife or biting edges made continuous an unbroken biting edge is provided almost entirely across each surface or face of the lock-washer which serves to securely bind or lock the parts between which the lock-washer is placed in such a manner that it is impossible for them to move or become loose.

In use the lock-washer is placed in position on the bolt, see Fig. 2, and as the nut is screwed inward thereon it causes the knife edges on both surfaces or faces of the lock-washer to slide over the surfaces of the fish plates and nut and compresses and straightens out the ring, but as soon as the nut, on account of the vibration or other cause, endeavors to turn off or turn outward in the other direction the straight and curved knife edges of the ring 6 will cut into or bite the faces of the fish plates and nut, or other surfaces between which it is placed, and the fish plate, nut and lock washer will be securely bound or locked together.

Although the knife edges will plane off a very thin shaving or portion from the surface of the fish plate and nut, in the locking operation yet it will be so thin that the thickness or strength of the fish plate and nut will not be perceptibly affected and the lock washer can be used an almost unlimited number of times without replacing it with a new one.

I do not wish to be understood as limiting myself to the specific details of construction and arrangement as herein described and illustrated, as it is manifest that variations and modifications may be made in the features of construction and arrangement, in the adaptation of the device to various conditions of use, without departing from the spirit and scope of my invention and improvements. I therefore reserve the right to all such variations and modifications as properly fall within the scope of my invention and the terms of the following claims.

What I claim is—

1. In a nut lock, a lock-washer comprising a ring with lugs extending beyond the outer circumference thereof provided with substantially parallel knife edges.

2. In a nut lock, a lock-washer comprising a ring having lugs extending laterally beyond the outer circumference thereof provided with inclined surfaces terminating in substantially parallel knife edges.

3. In a nut lock, a lock-washer comprising a ring having inclined surfaces or faces, curved knife edges, lugs extended laterally beyond the outer circumference of the said ring and having substantially parallel knife edges, the said knife edges being in different planes.

4. In a nut lock, a lock-washer comprising a ring having curved knife edges, reduced portions extending from the knife edges to the outer edge of the ring and lugs having knife edges.

5. In a nut lock, a lock-washer comprising a spirally twisted ring having reduced portions and curved knife edges and lugs extending laterally beyond said ring provided with substantially parallel knife edges.

6. In a nut lock, a lock-washer comprising a spirally twisted ring having reduced portions, curved knife edges above said reduced portions and laterally extending lugs provided with knife edges forming a continuation of the said curved knife edges.

7. In a nut lock, a lock-washer comprising a spirally twisted ring open at one side, having reduced portions and knife edges above said reduced portions, lugs extending laterally beyond the outer circumference of the ring and having knife edges forming a continuation of the said curved knife edges.

8. In a nut lock, a lock washer comprising a spirally twisted ring open at one side, having inclined reduced portions and knife edges above said reduced portions, spaced lugs extending laterally beyond the outer circumference of said ring having upwardly inclined surfaces terminating in knife edges which form a continuation of the knife edges of the lugs.

In testimony whereof I affix my signature in the presence of two witnesses.

ZACHARIAH HAWKINS.

Witnesses:
JOHN JACOB, Jr.,
ARTHUR E. WALTER.